United States Patent Office 3,634,487
Patented Jan. 11, 1972

3,634,487
METHOD OF PRODUCING ACRYLONITRILE
Khachik Egorovich Khcheian, Prospekt Mira 148a, kv. 190; Olga Mikhailovna Revenko, Ulitsa Chakalova 48a, kv. 53; Margarita Petrovna Tikhonova, Ulitsa Kibalchicha 8a, kv. 33; Antonina Grigorievna Polkovnikova, Jugo-Zapad, kvartal 42a, korpus 18, kv. 68; and Nikolai Emelianovich Mak, Nizhegorovdskaya ulitsa 92, korpus 2, kv. 17, all of Moscow, U.S.S.R.
No Drawing. Filed Feb. 17, 1969, Ser. No. 799,901
Claims priority, application U.S.S.R., Dec. 12, 1968, 1,288,316; Feb. 26, 1968, 1,221,056/23
Int. Cl. C07c *121/32, 121/02*
U.S. Cl. 260—465.9   8 Claims

ABSTRACT OF THE DISCLOSURE

Production of acrylonitrile by reacting acetonitrile and formaldehyde in the presence of a supported or unsupported catalyst comprising phosphates of metals of Groups I and II of the Periodic System. The reaction is preferably carried out in the vapour phase at a temperature of 300 to 450° C., a space velocity of 2000 to 6000 h.$^{-1}$ and a formaldehyde to acetonitrile molar ratio of 1–2:0.5–25.

---

The present invention relates to a method of producing acrylonitrile. As raw material acrylonitrile is used for manufacturing synthetic fibres, acrylonitrilebutadienestyrene resins (ABS), nitrile, rubber, acrylamide and acrylates.

The production of acrylonitrile by reacting acetonitrile and formaldehyde over dehydration catalysts containing silica gel or alumina is described in U.S. Pat. No. 2,386,586.

However, no mention is made in the patent as to what particular catalyst has been used in the production of acrylonitrile; the conditions employed in the production of acrylonitrile and yields of acrylonitrile based on the formaldehyde consumed in the reaction, the latter feature being one of the most important characteristics of the process.

In more recent works by S. Krzhizhanovsky and S. Malinovsky it has been found that in reacting acetonitrile and formalin over silica gel at a temperature of 500–550° C. and a space velocity of 300–360 h.$^{-1}$, conversion of formaldehyde constituted 30%. Yields of acrylonitrile based on the formaldehyde consumed in the reaction have not been mentioned.

It is an object of the present invention to provide a readily available catalyst for the process of converting acetonitrile into acrylonitrile.

This and other objects have been accomplished by providing a method of producing acrylonitrile wherein acetonitrile and formaldehyde are reacted in the presence of catalysts, which catalysts are, according to the invention, phosphates of metals of Groups I and II of the periodic system such as cadmium phosphate, calcium phosphate, zinc phosphate and lithium phosphate. The catalyst used in the rpocess may be either supported or unsupported. As a catalyst support it is advisable to use silica gel or magnesium silicate. Asbestos, pumice and the like materials may also be used as the catalyst support. The reaction is carried out in vapour phase at a temperature of from 300 to 450° C., preferably at a temperature of 350–420° C., and a vapour space velocity ranging from 2,000 to 6,000 h.$^{-1}$, the formaldehyde to acetonitrile molar ratio being 1–2:0.5–25.

The process may be performed either under atmospheric or superatmospheric pressure. The reaction of acetonitrile and formaldehyde, performed under the aforementioned conditions, results in a conversion as high as 80–95% based on the formaldehyde fed, the selectivity being 95–100%. The present method will find a wide commercial application due to the fact that acetonitrile is a readily available raw material which is produced in large amounts as a by-product (10–15% per ton of acrylonitrile) in the production of acrylonitrile by oxidizing ammolysis of propylene.

The present invention makes it possible to obtain the target product in a yield of 90% and higher.

For a better understanding of the present invention by those skilled in the art, the following examples are given by way of illustration.

EXAMPLE 1

32.3 g. of a mixture of acetonitrile and 35% aqeuous solution of formalin (molar ratio 14:1) were passed through a vaporizer and then through a lithium phosphate catalyst at a temperature of 390° C. and a space velocity of 2500 h.$^{-1}$. There were obtained 32 g. of a condensate containing 6.22% of acrylonitrile. The yield of acrylonitrile was 75% based on the formaldehyde fed and 95% based on the formaldehyde consumed in the reaction.

EXAMPLE 2

33.2 g. of a mixture of acetonitrile and 33% aqueous solution of formalin (molar ratio 12:1) were passed through a vaporizer and then through a lithium phosphate catalyst at a temperature of 370° C. and a space velocity of 3280 h.$^{-1}$. There were obtained 33 g. of a condensate containing 6.75% of acrylonitrile. The yield of acrylonitrile was 77% based on the formaldehyde fed and 97% based on the formaldehyde consumed in the reaction.

EXAMPLE 3

46 g. of a mixture of acetonitrile and 33% aqueous solution of formalin (molar ratio 20:1) were passed through a vaporizer and then through a lihium phosphate catalyst at a temperature of 39° C. and a space velocity of 3210 h.$^{-1}$. There were obtained 45.8 g. of a condensate containing 5.2% of acrylonitrile. The yield of acrylonitrile was 92% based on the formaldehyde fed and 100% based on the formaldehyde consumed in the reaction.

EXAMPLE 4

22.7 g. of a mixture of acetonitrile and 33% aqueous solution of formalin (molar ratio 7:1) were passed through a vaporizer and then through a catalyst which consisted 50% of LiPO$_4$ and 50% of SiO$_2$ at a temperature of 405° C. and a space velocity of 2400 h.$^{-1}$. There were obtained 22.66 g. of a condensate containing 10% of acrylonitrile. The yield of acrylonitrile was 79% based on the formaldehyde fed and 92% based on the formaldehyde consumed in the reaction.

EXAMPLE 5

23.5 g. of a mixture of acetonitrile and 34% aqueous solution of formalin (molar ratio 8:1) were passed through a vaporizer and then through a lithium phosphate catalyst diluted 50% with silica gel at a temperature of 410° C. and a space velocity of 2400 h.$^{-1}$. There were obtained 23.05 g. of a condensate containing 10.6% of acrylonitrile. The yield was 83% based on the formaldehyde fed and 92% on the formaldehyde consumed in the reaction.

EXAMPLE 6

23.95 g. of a mixture of acetonitrile and 35% aqueous solution of formalin (molar ratio 7:1) were passed through a vaporizer and then through a catalyst which consisted 50% of Li$_3$PO$_4$ and 50% of magnesium silicate (talc) at a temperature of 415° C. and a space velocity of 3100 h.$^{-1}$.

There was obtained 24 g. of a condensate containing 10.5% of acrylonitrile. The yield of acrylonitrile was 74% based on the formaldehyde fed and 100% based on the formaldehyde consumed in the reaction.

EXAMPLE 7

21.9 g. of a mixture of acetonitrile and 35% aqueous solution of formalin (molar ratio 8:1) were passed through a vaporizer and then through a lithium phosphate catalyst diluted 50% with talc at a temperature of 415° C. and a space velocity of 2900 h.$^{-1}$. There were obtained 21.8 g. of a condensate containing 10.8% of acrylonitrile. The yield was 78.6% based on the formaldehyde fed and 96.8% on the formaldehyde consumed in the reaction.

What we claim is:

1. A method for producing acrylonitrile which comprises reacting acetonitrile with formaldehyde in the vapor phase in the presence of a catalyst selected from the group consisting of the phosphates of Groups I and II metals, at a temperature of from 300° to 450° C. and at a space velocity of the reactants of from 2,000 to 6,000 hr.$^{-1}$, the formaldehyde-to-acetonitrile molar ratio being 1–2:0.5–25.

2. A method for producing acrylonitrile according to claim 1 at a temperature of from 350° to 420° C. and at a space velocity of the reactants of from 2,400 to 3,280 hr.$^{-1}$, the formaldehyde-to-acetonitrile molar ratio being 1:7–20.

3. A method as claimed in claim 2 wherein the catalyst is lithium phosphate.

4. A method as claimed in claim 2 wherein the catalyst is calcium phosphate.

5. A method as claimed in claim 2 wherein the catalyst is supported on a carrier.

6. A method as claimed in claim 5 wherein the catalyst is supported with silica gel.

7. A method as claimed in claim 5 wherein the catalyst is supported with magnesium silicate.

8. A method for producing acrylonitrile according to claim 1 wherein the catalyst is supported on a carrier.

References Cited

UNITED STATES PATENTS

| | | | |
|---|---|---|---|
| 2,386,586 | 10/1945 | Brant et al. | 260—465.9 X |
| 2,392,303 | 1/1946 | Balcar | 260—465.9 |
| 2,690,452 | 9/1954 | Carpenter | 260—465.9 |
| 3,060,236 | 10/1962 | Kollar et al. | 260—465.9 X |

JOSEPH P. BRUST, Primary Examiner